(12) United States Patent
Smith et al.

(10) Patent No.: US 9,107,231 B2
(45) Date of Patent: Aug. 11, 2015

(54) MULTIUSER SCHEDULING FOR RADIO RESOURCE ALLOCATION

(71) Applicants: Peter Jeffry Smith, Christchurch (NZ); Dushyantha Anuruddha Basnayaka, Christchurch (NZ)

(72) Inventors: Peter Jeffry Smith, Christchurch (NZ); Dushyantha Anuruddha Basnayaka, Christchurch (NZ)

(73) Assignee: Tait Limited, Christchurch (NZ)

( * ) Notice: Subject to any disclaimer, the term of this patent is extended or adjusted under 35 U.S.C. 154(b) by 266 days.

(21) Appl. No.: 13/896,969

(22) Filed: May 17, 2013

(65) Prior Publication Data

US 2013/0310097 A1    Nov. 21, 2013

Related U.S. Application Data

(60) Provisional application No. 61/648,505, filed on May 17, 2012.

(51) Int. Cl.
*H04W 72/12* (2009.01)

(52) U.S. Cl.
CPC ........ *H04W 72/1205* (2013.01); *H04W 72/121* (2013.01); *H04W 72/1231* (2013.01); *H04W 72/1247* (2013.01)

(58) Field of Classification Search
CPC ............ H04W 72/1205; H04W 72/00; H04W 72/005; H04W 72/02; H04W 72/04; H04W 72/044; H04W 72/0446; H04W 72/046; H04W 72/0466; H04W 72/0473; H04W 72/048; H04W 72/0486; H04W 72/0493; H04W 72/06

USPC ............. 455/509, 453, 423, 436, 452.2, 450, 455/522; 370/252, 338
See application file for complete search history.

(56) References Cited

U.S. PATENT DOCUMENTS

| 2007/0054671 | A1* | 3/2007 | Meyers et al. | 455/453 |
| 2007/0155395 | A1* | 7/2007 | Gopalakrishnan et al. | 455/453 |
| 2010/0075693 | A1* | 3/2010 | Kishigami et al. | 455/452.2 |
| 2011/0205913 | A1* | 8/2011 | Van Zelst et al. | 370/252 |
| 2012/0250558 | A1* | 10/2012 | Chung et al. | 370/252 |
| 2013/0244657 | A1* | 9/2013 | Wang et al. | 455/436 |

OTHER PUBLICATIONS

Basnayaka, Dushyantha A., et al. "Performance Analysis of Macrodiversity MIMO Systems with MMSE and ZF Receivers in Flat Rayleigh Fading," IEEE Transactions on Wireless Communications, Early Access Articles 2013, Apr. 2013, vol. PP, Issue 99, pp. 1-12.

* cited by examiner

*Primary Examiner* — Tan Trinh
(74) *Attorney, Agent, or Firm* — Blakely, Sokoloff, Taylor & Zafman LLP

(57) ABSTRACT

Terminals in a wireless communication system are scheduled according to a metric based on average power data received from a plurality of terminals at a plurality of base stations. An acceptable metric lies below a threshold value determined by the particular user's quality of service requirement. Groups of terminals are scheduled for simultaneous transmission in respective intervals of time or frequency. An equation for the metric $\tilde{K}_o$ is defined.

3 Claims, 5 Drawing Sheets

MULTIUSER SCHEDULING FOR RADIO RESOURCE ALLOCATION

RELATED APPLICATIONS

This application claims the benefit of U.S. Provisional Application No. 61/648,505, filed May 17, 2012, which is incorporated by reference herein in its entirety.

BACKGROUND TO THE INVENTION

This invention relates to scheduling of terminals in wireless communication systems, and in particular but not only, to a scheduling metric which may be efficiently calculated for terminals in a mobile radio system.

A wireless communication system is usually configured to balance efficient utilisation of the wireless medium with acceptable quality of service for users. A scheduler is provided to implement this balance. Ideally the scheduler would assign multiple users to a single resource, which produces a linear increase in utilisation. However, interference between an increasing number of users will degrade service quality to some extent.

A scheduler may use a fixed or statistical estimation of quality as a metric when allocating resources to users in a multiuser system, such as signal to interference levels or bit error rates for example. The scheduler receives data relating to the user terminals, from base stations in the system, and attempts to determine which groups of terminals are best allowed to transmit simultaneously during an interval of time or radio frequency.

The terminals in these wireless systems may use a wide range of communication protocols. They may be narrowband transmitters for example, operating within a 12.5 kHz channel such as provided in P25 APCO, DMR or analogue radio, or operating within a 6.25 kHz channel as provided in dPMR. Alternatively they may be relatively wideband transmitters using one or more 180 kHz resource blocks as provided in LTE. Scheduling of terminals using a mixture of protocols such as LTE and P25 may also be required.

SUMMARY OF THE INVENTION

It is an object of the invention to provide for improved scheduling of radio terminals in wireless communication systems, or at least to provide an alternative to existing scheduling systems.

The invention may be said to reside in a method of scheduling terminals in a wireless communication system, including: determining average power received from a plurality of terminals at a plurality of base stations, determining a metric for each terminal based on the average powers, determining a group of terminals each having an acceptable metric, and scheduling the group of terminals for simultaneous transmission in a time or frequency interval.

Preferably the metric $\tilde{K}_o$ for a terminal has a direct functional relationship to the symbol error rate and is calculated according to:

$$\tilde{K}_0 \approx \frac{1}{|P_1|} \frac{\text{Perm}(Q_2)}{\text{Perm}(P_1^{-1} Q_2)}$$

Where:
$P_1$ is a diagonal matrix containing average powers received from the terminal at each of the base stations, $Q_2 = E\{H_2 o H_2\}$, E being the expectation operator, o being the Hadamard product, and $H_2$ is the channel matrix after removing column one relating to the terminal.

The invention may also be said to reside in a scheduler for a wireless communication system, having a processor and a memory containing instructions, wherein the instructions cause the processor to carry out a method and calculation as defined above.

The invention also resides in a method of calculating a quality parameter for a terminal in a wireless communications system including receiving data relating to long term measurements of the terminals, such as average power, and using the data to calculate $\tilde{K}_o$ as defined above.

An acceptable metric lies below a threshold value determined by the particular user's quality of service requirement. Groups of terminals are scheduled for simultaneous transmission in respective intervals.

LIST OF FIGURES

Preferred embodiments of the invention will be described with respect to the accompanying drawings, of which:

FIG. 1 schematically shows a wireless communication system with a scheduler,

FIG. 2 outlines allocation of resources to groups of terminals in the system,

FIG. 3 outlines assessment of the groups by the scheduler,

DESCRIPTION OF PREFERRED EMBODIMENTS

Referring to these drawings it will be appreciated that the invention can be implemented in a variety of ways for a range of different wireless systems such as mobile radio or cellular phone systems. It will also be appreciated that many standard components of a wireless system have been omitted for clarity, and that these embodiments are described by way of example only.

Figure 1:
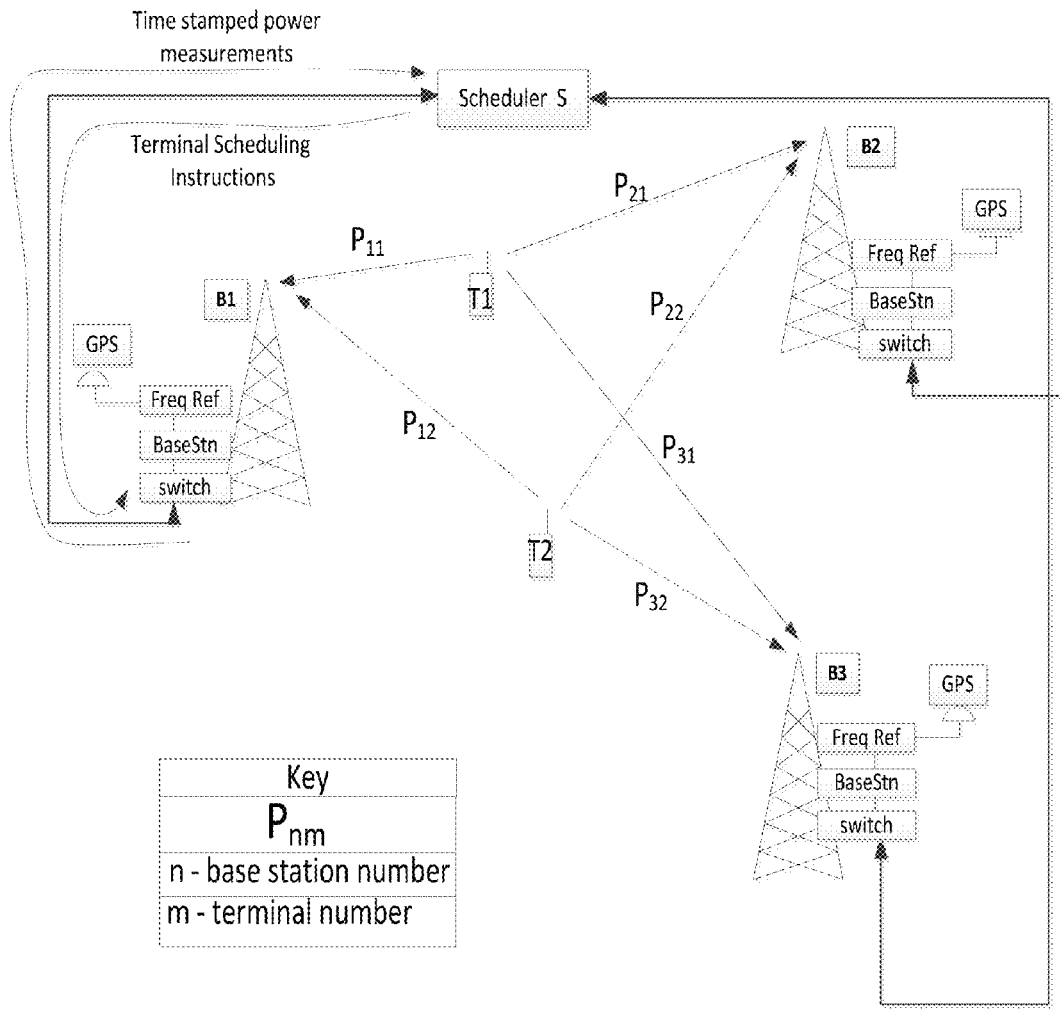

FIG. 1 shows part of a mobile radio system having base stations B1, B2, B3 providing services to user terminals T1, T2. Terminals and base stations transmit uplink and downlink signals to base stations and terminals respectively. Each base station is located by GPS and is connected to an IP backbone through a switch, forming a network. The base stations are also connected to a scheduler S which implements a scheduling process for the terminals. The scheduler attempts to balance the requirements for efficient use of the wireless medium and acceptable signal quality for each user, by determining which terminals may be temporarily grouped for simultaneous transmission, as described below. Many more base stations, terminals and other conventional components would typically be involved in a commercial network and would be distributed over a wide geographic area.

The scheduler may be provided in a range of forms, such as part of a base station or a separate backhaul processing unit. It typically includes a memory containing software instructions and a processor which carries out the instructions. A database containing data related to user terminals, such as respective priority, required signal quality, and average power is typically located at the scheduler, or possibly elsewhere in the system. The database receives ongoing data from base stations which are serving terminals in a common area, such as centre excited and/or edge excited cells in a cellular network. In the example of FIG. 1, the scheduler is receiving average power data in the form $P_{nm}$ where n refers to the base station at which the power level $P_{nm}$ is measured for terminal m. The scheduler is also sending terminal scheduling instructions to the base stations for transmission to the terminals. A further database containing a grouping table is also located in the system.

Figure 2:
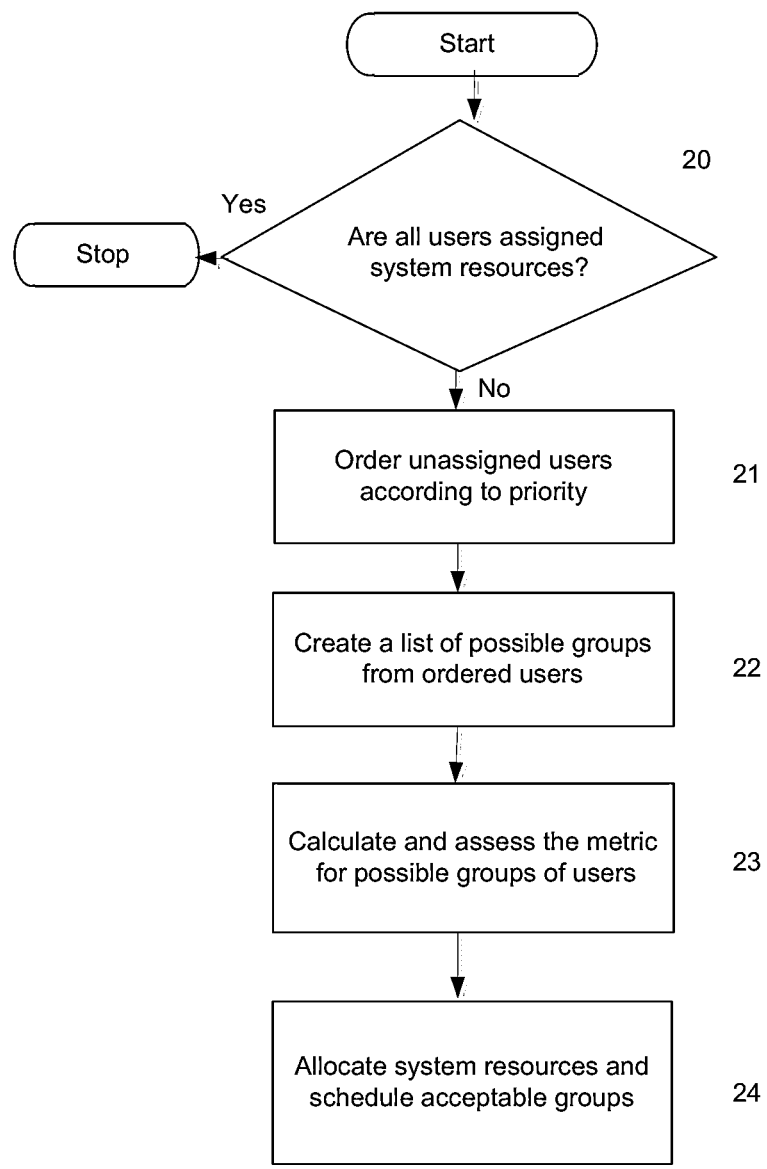

FIG. 2 provides an overview of a typical scheduling process in a wireless communication system such as shown in FIG. 1. The scheduler first checks 20 whether all user terminals requiring resources are scheduled to transmit. Any such terminals not yet assigned transmit resources are ordered 21 according to their respective priorities. A list of possible groups is then created 22 from the list of unassigned terminals. The list may be divided into groups having fixed numbers of terminals for example, or according to predetermined priority ranges. The groups are assessed 23 by calculation of predetermined metrics and modified where required. The resulting groups are entered in a grouping table and scheduled 24 for transmission in the system. Each terminal which has been allocated a resource by this process is removed from the list of terminals requiring resources. The process may be repeated for any terminals which have not been allocated into groups.

Figure 3:
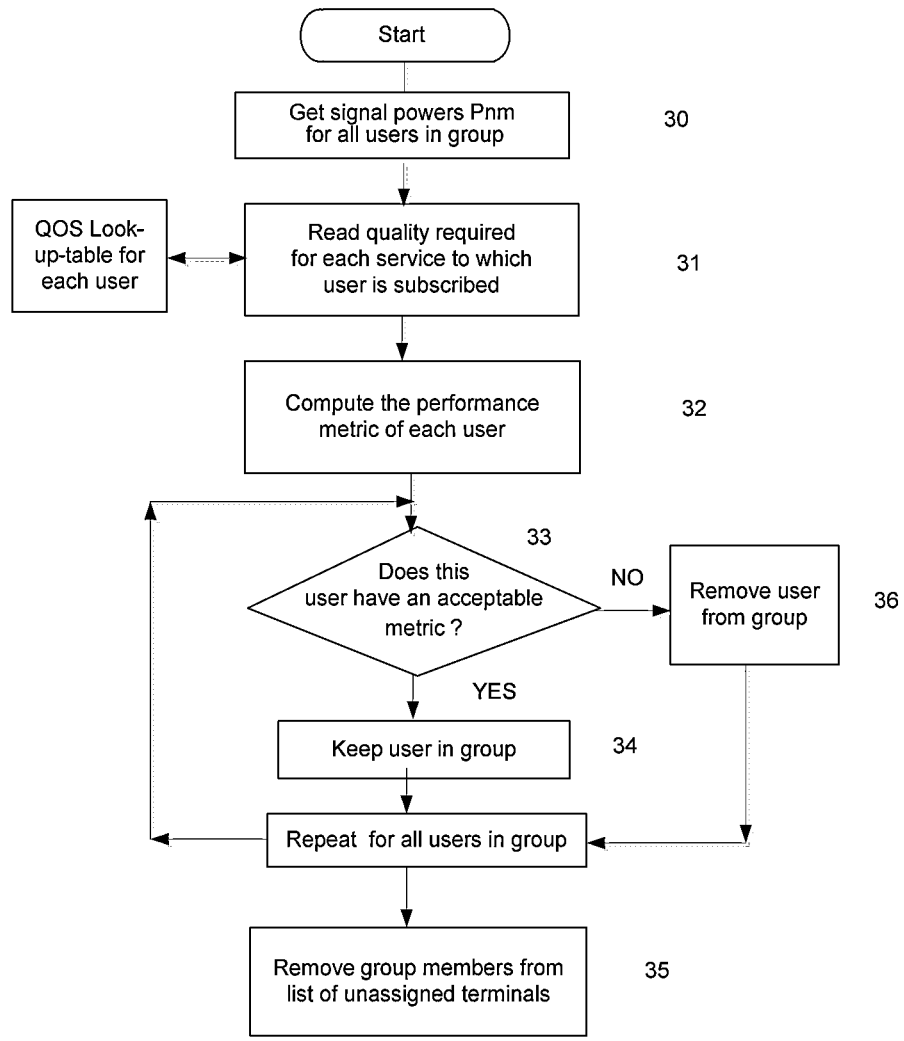

FIG. 3 outlines how assessment of the user terminals in a group may be carried out in the scheduling process of FIG. 2. The scheduler first reads 30 the average power of each terminal to be assessed, from a database containing the most recent data received from the base stations. Terminals are normally subscribed to one or more services and the quality required by each user for each service is also determined 31 from a database. The power and quality data is then used 32 to calculate a metric for each terminal in the group. The metric is preferably a function of the symbol error rate based on relatively long term measurements, such as a running average of signal power, rather than instantaneous information which is not always accessible when required. A metric value is calculated for each terminal in the current group and compared 33 with a threshold value determined by the user's quality of service requirements. Each terminal having an acceptable metric and possibly other parameters is retained 34 in the group. Once all users have an acceptable metric then the group is removed 35 from the list of unassigned terminals and may be scheduled for common transmission. Terminals not having an acceptable metric are removed 36 from the group and scheduled in a separate process, such as a repeat of the process in FIG. 2. A terminal removed could be the lowest priority user or the user with the worst metric. If terminals are removed from a group, the process may be repeated and fresh metrics calculated for the remaining terminals.

Figure 4:
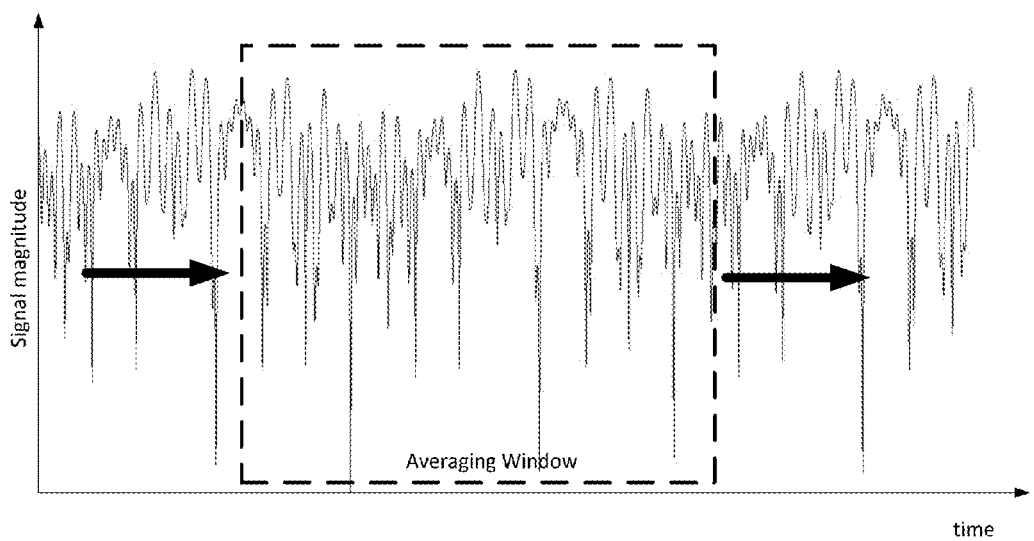
FIG. 4 shows a power averaging process.

FIG. 4 shows how the signal received from a terminal radio may be averaged. The received signal is typically a combination of a small-scale quasi-stationary process, known as multipath fading, superimposed on a medium-scale process, known as shadowing. Shadowing has a slower time-dependence which can cause slow long term variations in the average received signal power. This example shows a signal containing rapid fading effects over an interval of roughly one second, with a typical averaging window of about half a second.

Figure 5:
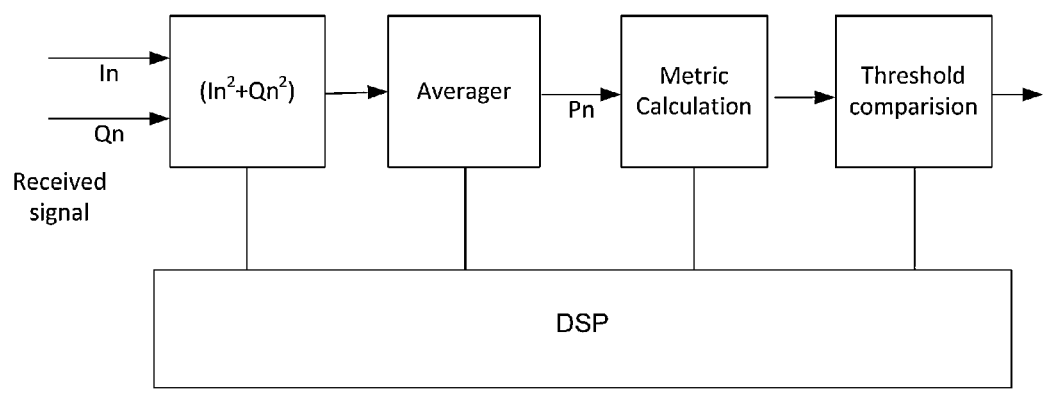
FIG. 5 shows a scheduler using average power values.

FIG. 5 schematically shows a scheduler as a digital signal processor programmed to carry out a series of functions. The I, Q samples of a single received radio signal are converted into a power value which is then averaged to form Pn. A metric value is then calculated and compared with a threshold typically determined by user quality requirements of the radio. A preamble period may be required to provide a close estimate of the long term power. The power estimation procedure then continues to average the power based on current I, Q samples and provides a continuously updated value.

Various performance metrics are used in existing scheduling systems. The following analysis outlines a derivation based on average signal powers measured at a zero-forcing (ZF) linear receiver under conditions of macro diversity in which terminals and base stations are widely separated. The result for a ZF receiver operating in the high SNR region also provides a good approximation to minimum mean squared error (MMSE) linear receivers. Hence, the result is likely to provide a reasonable performance metric for a range of linear receivers. Furthermore, iterative receivers often use linear methods at each stage of the iteration and therefore the result also has direct application to non-linear, iterative receivers using linear processing at each stage. This metric is a closed form asymptotic expression which is proportional to the symbol error rate of any one user in a particular group of terminal transmitters.

The output signal to noise ratio (SNR) for the first user terminal of a zero forcing (ZF) receiver, which receives signals from a plurality of terminals 1 ... N, is given by:

$$\tilde{Z} = \frac{1}{\sigma^2} h_1^H (I - H_2(H_2^H H_2)^{-1} H_2^H) h_1$$

$$= \frac{1}{\sigma^2} h_1^H M h_1,$$

Where:
$M = I - H_2(H_2^H H_2)^{-1} H_2^H$ and $H = (h_1 H_2)$ $H_2$ is the channel matrix after removing column one relating to terminal 1

$h_1$ is the column of H relating to terminal 1

The characteristic function of Z is then given by a simple application of the Gaussian integral as:

$$\tilde{\phi}(t) = E\left\{\frac{1}{\left|I - jt\frac{1}{\sigma^{2a}} MP_1\right|}\right\}$$

Where:
$P_1$ is a diagonal matrix given by $P_1 = \text{diag}(P_{11}, P_{21}, \ldots)$ $P_{ij}$ being the link power from source j to receive antenna i.

Expanding $MP_1$ in the above equation and rearranging by matrix algebra gives:

$$\tilde{\phi}(t) \approx \frac{1}{|D|}\left\{\frac{E\{|H_2^H H_2|\}}{E\{|H_2^H D^{-1} H_2|\}}\right\}$$

Where: D is a diagonal matrix defined by $$D = I - jt\frac{1}{\sigma^2} P_1$$

An exact calculation of the above equation is complex but may be estimated using the Laplace approximation, which allows the characteristic function to be written as:

$$\tilde{\phi}(t) \approx \frac{\text{Perm}(Q_2)}{|D|\text{Perm}(D^{-1}Q_2)},$$

Where:
$Q_2 = E\{H_2 o H_2\}$ contains the powers of the links from terminals 2, 3, ..., N
E denotes the expectation operator,
o denotes the Hadamard product,
Perm denotes the permanent function applied to a matrix.

The approach used to simplify the characteristic function is a Taylor series expansion in powers of $\sigma^2$. To compute an asymptotic (high SNR) result for use as a performance metric, we let $\sigma^2 \to 0$.

Keeping only the dominant term in the above equation, which is of order $(\sigma^2)^{n_R-N+1}$, gives:

$$\tilde{\phi}(t) \approx \tilde{K}_o \left(\frac{\sigma^2}{jt}\right)^{n_R-N+1}$$

where the metric appears as:

$$\tilde{K}_0 \approx \frac{1}{|P_1|} \frac{\text{Perm}(Q_2)}{\text{Perm}(P_1^{-1}Q_2)}$$

$P_1$ is a diagonal matrix containing average powers received from the terminal at each of the base stations,
$Q_2 = E\{H_2 o H_2\}$, E being the expectation operator, o being the Hadamard product, and
$H_2$ is the channel matrix after removing column one relating to the terminal.

Further details of the metric calculation may be found in the following paper which is incorporated by reference herein in its entirety. The metric appears as equation 54.

IEEE Transactions on Wireless Communications, Early Access Articles 2013, entitled "Performance Analysis of Macrodiversity MIMO Systems with MMSE and ZF Receivers in Flat Rayleigh Fading," by Basnayaka, D.; Smith, P.; Martin, P. Volume: PP, Issue: 99 Pages: 1-12, April, 2013.

The invention claimed is:

1. A method of scheduling terminals in a wireless communication system, including:
   determining average power received from a plurality of terminals at a plurality of base stations,
   determining a metric $\tilde{K}_o$ for each terminal based on the average power, wherein $$\tilde{K}_0 \approx \frac{1}{|P_1|} \frac{\text{Perm}(Q_2)}{\text{Perm}(P_1^{-1}Q_2)}$$

wherein $P_1$ is a diagonal matrix containing average powers received from the terminal at each of the base stations, wherein $Q_2 = E\{H_2 o H_2\}$, E being an expectation operator, o being an Hadamard product, and $H_2$ is a channel matrix after removing column one relating to the terminal,
   determining a group of terminals each having an acceptable metric, and
   scheduling the group of terminals for simultaneous transmission in a time or frequency interval.

2. A scheduler for a wireless communication system, having a processor and a memory containing instructions, wherein the instructions cause the processor to:
   determine average power received from a plurality of terminals at a plurality of base stations,
   determine a metric $\tilde{K}_o$ for each terminal based on the average power, wherein $$\tilde{K}_0 \approx \frac{1}{|P_1|} \frac{\text{Perm}(Q_2)}{\text{Perm}(P_1^{-1}Q_2)}$$

wherein $P_1$ is a diagonal matrix containing average powers received from the terminal at each of the base stations, wherein $Q_2 = E\{H_2 o H_2\}$, E being an expectation operator, o being an Hadamard product, and $H_2$ is a channel matrix after removing column one relating to the terminal,
   determine a group of terminals each having an acceptable metric, and
   schedule the group of terminals for simultaneous transmission in a time or frequency interval.

3. A method of calculating a quality parameter for a terminal in a wireless communications system including receiving data from a plurality of base stations and terminal in the system and using the data to calculate:

$$\tilde{K}_0 \approx \frac{1}{|P_1|} \frac{\text{Perm}(Q_2)}{\text{Perm}(P_1^{-1}Q_2)}$$

Where:
$P_1$ is a diagonal matrix containing average powers received from the terminal at each of the base stations,
$Q_2 = E\{H_2 o H_2\}$, E being an expectation operator, o being an Hadamard product, and
$H_2$ is a channel matrix after removing column one relating to the terminal.

* * * * *